United States Patent Office 3,813,383
Patented May 28, 1974

3,813,383
METHOD OF PRODUCING A MOLLUSCICIDE FROM ENDOD
Aklilu Lemma, Addis Ababa, Robert M. Parkhurst, Menlo Park, and Wilfred A. Skinner, Jr., Portola Valley, Calif., assignors to Ethiopian Science Foundation, Addis Ababa, Ethiopia
No Drawing. Filed Jan. 19, 1973, Ser. No. 325,037
Int. Cl. C07g 17/00; A01n 9/08
U.S. Cl. 260—236.5    5 Claims

ABSTRACT OF THE DISCLOSURE

A molluscicide is produced from Endod by removing the fatty constituents of Endod by extraction with a fat solvent, soaking the defatted Endod in warm water, extracting the soaked Endod with a solvent which is substantially insoluble or only slightly soluble in water and evaporating at least a portion of the solvent.

---

The invention herein described was made in the course of or under a contract or subcontract thereunder with the Department of the Navy.

BACKGROUND OF THE INVENTION

Molluscs have been found to be responsible for the spread of many human and animal infections particularly in tropical regions, especially bilharzia and fascioliasis. These are major diseases in Africa, Asia and South America, the causative agent being certain species of nematodes of the genus Schistosoma. It has been found that in the life cycle of Schistosoma, water-snails act as a host at the larval stage in the development of the worm and the disease can be transmitted to humans who come into contact with the water in which infected water-snails have been living. A measure of control of bilharzia can be achieved by an attack on the snails which act as a vector in the transmission of the disease, and hence there is a need for materials capable of controlling the growth of the species of snail that can act as host to the disease causing organisms.

Molluscicidal agents to be used effectively in the control of the snail vectors should desirably have a high level of toxicity towards the snail species, coupled with low mammalian toxicity and high stability, since it is usually necessary to apply the molluscicidal agents to very large volumes of water, e.g. in rivers, canals, lakes, etc., to ensure that toxic levels of the molluscicide are maintained for prolonged periods of time in the regions where the small vectors are found.

A molluscicide extracted from Endod has been used heretofore to kill the host water-snails and thus prevent the spread of these diseases, particularly Schistosomiasis. Preference may be had to British Pat. 1,277,417 published June 14, 1972 (a corresponding United States application was filed). The extract of the British patent is produced by extracting defatted Endod berries with a hot alcoholic solvent and then subjecting the alcoholic extract to alkaline hydrolysis. The alcohol specifically disclosed is methanol.

Since molluscicides are necessarily used in large bodies of water, potency generally has a marked effect on costs. The method of this invention provides a molluscicide with slightly more or equal potency than the molluscicide produced by the methanol process of British Pat. 1,277,-417 without the use of continuously refluxing methanol and extended alkaline hydrolysis which are both time consuming and more costly. In addition, it is not significantly affected by variation in environmental factors such as pH, ambient temperature, ultraviolet light from the sun, and the presence of different concentrations of organic matter. The method of the invention can be used inexpensively in tropical areas where Endod is found and the need for a cheap and safe molluscicide is great.

In the method disclosed in the British patent defatted Endod berries are treated with methanol. It was found that n-butanol cannot be substituted for methanol in the process disclosed in British Pat. 1,277,417 to produce an active molluscicide. Unexpectedly, it has now been found that n-butanol can be used to produce a highly desirable molluscicide when it is used after the Endod has been defatted and soaked in water.

SUMMARY OF THE INVENTION

Defatted Endod is extracted with water. The water extract is then extracted with a slightly water soluble monoatomic aliphatic alcohol in which water is slightly soluble. The alcohol is of the formula $C_nH_{2n+1}OH$, when $n$ is a number from 4 to 8, advantageously from 4 to 6, for example, 3-pentanol, 1-hexanol, 2-hexanol, 1-heptanol and preferably 1-butanol (n-butanol). Advantageously the mutual partial solubility of the alcohol in water and the water in the alcohol will not exceed 9 grams of solute in 100 ml. of solvent at 20° C. Advantageously, a portion or all of the alcohol is evaporated.

DETAILED DESCRIPTION OF THE INVENTION

It is well known to defat Endod berries by treating the berries with a fat solvent to remove the fatty constituents. A wide range of fat solvents may be employed, for example, petroleum ether or an alkyl oxide such as diethyl ether. The defatting is advantageously carried out on dried Endod berries which preferably have been ground to a powder.

The defatted Endod is extracted with water. The water advantageously is at a temperature in the range of from 20° C. to 100° C. It is preferred to carry out the extraction for at least 12 hours. The alcohol set forth above in the summary of the invention is then added to the water extract and remaining solids and mixed therewith. The alcohol extract is then recovered by, for example, introducing the water-alcohol-solids into a percolation column. The recovered alcohol extract can be mixed directly with water as a molluscicide or the alcohol can be evaporated to provide a solid molluscicide for subsequent mixing with the water to be treated. If desired, before adding the alcohol, the solids can be separated out of the water extract as by centrifuging and the alcohol added to the remaining aqueous liquid. A still purer product is achieved if the material remaining after evaporating the alcohol is washed with diethyl ether.

The invention will be further clarified by reference to the following examples:

EXAMPLE I

Endod berries, collected from wild plants in Ethiopia, are sun-dried for 3 days, ground to a fine powder (100–200 mesh) and used as stock material. 25 kg. of ground berries are extracted with 80 liters of petroleum ether by percolation to remove fatty materials. Evaporation *in vacuo* of the petroleum ether gives about 200 g. of a green wax, which is inactive against snails. The defatted ground berries are extracted twice with 200 liters of warm water at 70° C. each time the mixture is allowed to stand overnight. Solids are removed by centrifugation to yield 400 liters of a clear brown solution. The inactive solid residue, half the weight of the original material, is discarded. The remaining aqueous solution is then extracted twice with 200 liters of n-butanol, which yields 5 kg. upon evaporation. After washing with diethyl ether, the product is a light tan powder. When *Biomphalaria glabrata* are exposed for 24 hours to the butanol extract at 26° C. and pH of 7.4, the $LC_{90}$ (lethal concentration to kill 90% of the snails) of the extract is 3.0 parts per million (p.p.m.);

the corresponding value for the crude material is 22.3 p.p.m.

EXAMPLE II

Ten 25-gram samples of ground Endod berries are extracted with petroleum ether to remove inert fatty materials. These 25-gram samples are mixed with water in the ratios of 25:12, 25:20, 25:25, 25:30, 25:35, 25:40, 25:45, 25:50, 25:55 and 25:60 and each is allowed to stand overnight. Each mixture is placed in a glass percolation column (3 cm. in diameter) with a glass wool plug at the bottom. One hundred ml. of n-butanol are added to the top of each column and allowed to pass through the mixture. Evaporation of the n-butanol extract gives solid residues which range from 4.38 gm. for the first and 9.78 gm. for the last. All of the solid residues recovered from the n-butanol extractions are toxic to snails, although only the material (8.31 gm.) recovered from the 25:35 mixture is as toxic as the material obtained in Example I.

Dry Endod powder is percolated with n-butanol alone (without water) giving inactive material.

It is to be understood that the foregoing examples are by way of illustration of the method of the invention and are not intended to be limiting.

What is claimed is:

1. The method of producing a molluscicide comprising: extracting defatted Endod with water, and extracting the thus formed extract with a mono functional aliphatic alcohol having a low solubility in water, said alcohol having the formula $C_nH_{2n+1}OH$ when $n$ is a number from 4 to 8.

2. The method of claim 1 in which the alcohol is evaporated after extraction.

3. The method of claim 1 in which the water is at a temperature in the range of from 20° to 100° C.

4. The method of claim 1 in which the alcohol is n-butanol.

5. The method of claim 4 in which the water is at a temperature in the range of from 20° to 100° C.

References Cited

FOREIGN PATENTS 1,277,417    6/1972    Great Britain _____ 260—236.5

OTHER REFERENCES

C. A. 72:19,094s (1970), Powell et al.
Phytochemistry 8:2105–2107. (1969), Powell et al.

HENRY R. JILES, Primary Examiner

S. D. WINTERS, Assistant Examiner

U.S. Cl. X.R.

424—195